2,879,307
PROCESS FOR THE REDUCTION OF CARBONYL COMPOUNDS TO ALCOHOLS

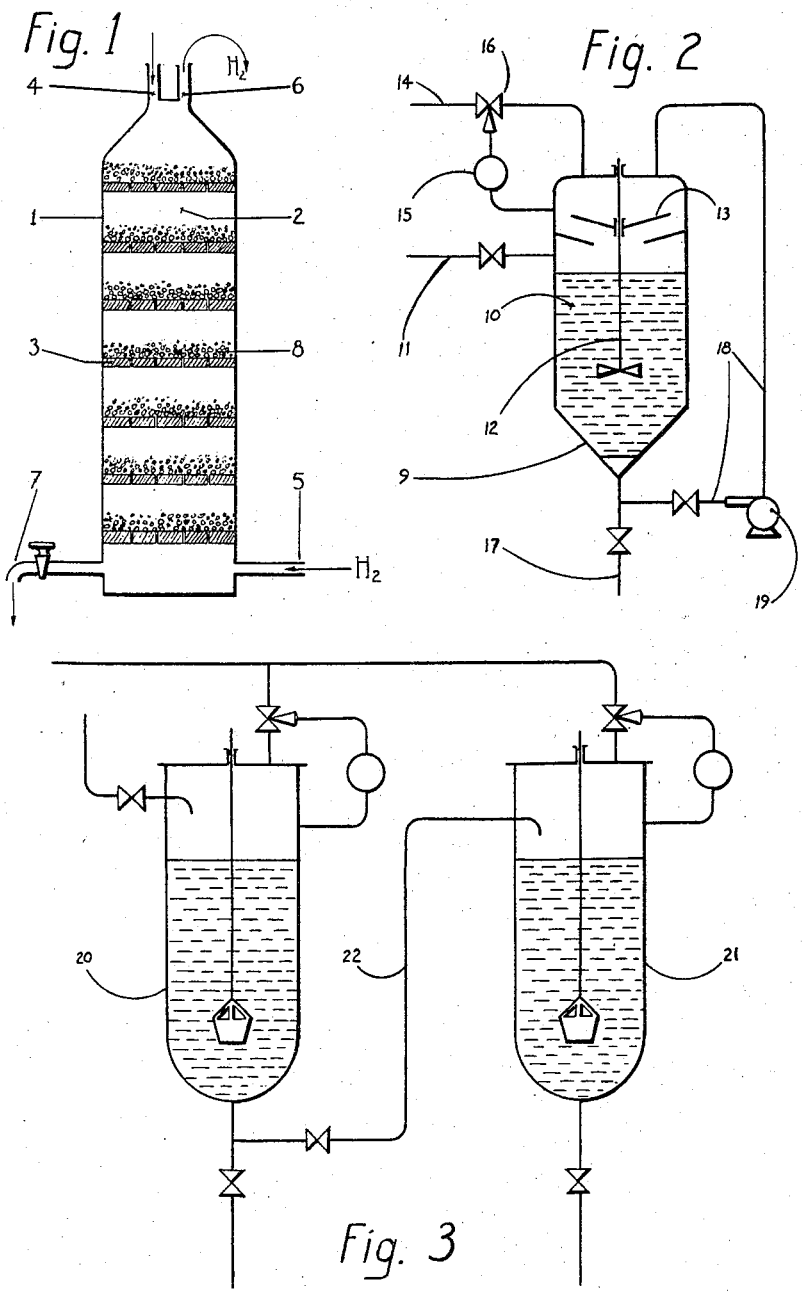

André von Bezard and André Jacot-Guillarmod, Geneva, Switzerland, assignors to Dumont Freres & Cie, Chassart, Belgium, a firm of Belgium Application June 25, 1956, Serial No. 593,667

13 Claims. (Cl. 260—635)

The present invention relates to a process for the reduction of carbonyl compounds. It is to be understood, by carbonyl compounds, the aldehydes, oxyaldehydes, ketones, etc.

According to the known processes, the reduction of the carbonyl function is performed under high pressure (between 1422 and 2133 lbs. per sq. inch) and at a temperature of about 100 to 150° C., by using catalysers like palladium, platinum oxide or nickel monoxide.

In some cases (in the case of the sugars for instance), it has been remarked that the hydrogenation velocity depends upon the pH of the medium in which the reaction is performed, and that this velocity is highly increased when the medium is alkaline (see U.S. Patents Nos. 2,546,103, 2,609,399 and 2,642,462, and Swiss Patent No. 261,359).

The Swiss Patent No. 261,359 indicates that the hydrogenation occurs even under normal pressure, when in the presence of weak bases such as calcium oxide, magnesium oxide or ammonia.

However, these process show among others the drawback that under the influence of the bases, the carbonyl function undergoes a dismutation according to the known reaction of Cannizzaro. This dismutation is highly accelerated by the catalyser, like Raney nickel, needed for the hydrogenation. The alcohols obtained are always accompanied with an undesired quantity of salts of the acids. Also, it is not advisable to use strong bases because by doing so dismutation is promoted, resulting in a loss of efficiency. Moreover, it is necessary to carry out a supplementary operation for separating the alcohols from the acids.

One object of the present invention is to suppress these drawbacks while producing, with a very high efficiency, the reduced form of the carbonyl function by a low temperature and low pressure process. While under the conditions indicated in the above mentioned patents, the hydrogenation velocity is too low for allowing an industrial exploitation, the present process has as a further object the acceleration of the reaction; this acceleration can be obtained by the presence of hydroxyl ions which may be compared with a catalyser which does not participate in the reaction of dismutation (of Cannizzaro) that it creates. The work which has led to the present invention has determined the conditions under which the reaction of dismutation can be largely reduced, practically eliminated, in such a way that the reaction could be considered as being a catalytic one. To this end, alkaline resins are substituted to provide a free ion OH (base). It has been remarked that with the use of such resins, such hydrogenation velocities are reached which permit industrial exploitation with an efficiency near 100%.

In the process according to the present invention, the catalytic hydrogenation is performed in presence of at least a non-soluble ion exchanger.

This process can be used as well in continuous as in discontinuous systems.

The ion exchanger will preferably be an alkaline one.

In this condition the carbonyl compounds are in an alkaline medium only at the moment of their contact with the ion exchanger, and the catalytic influence of the metallic catalyser on the parasite reaction, that is to say the reaction of Cannizzaro, can occur only at the very moment of the hydrogenation. Moreover, the few quantities of acids created are fixed by the ion exchanger during the hydrogenation, so that the alcohols are automatically separated from the acids, without any special operation being necessary to accomplish this end.

The annexed drawings show, by way of example, three embodiments of an installation for carrying out the process according to the invention.

Fig. 1 is an axial sectional view of a column designed to perform reduction by hydrogenation.

Fig. 2 is an elevational view of another embodiment of the reactor.

Fig. 3 is an elevational view of two reactors mounted in series.

The apparatus represented in Fig. 1 comprises a vertical tube 1 the height of which is divided in a set of partitions 2 by perforated horizontal walls. The substance to be reduced is introduced into the apparatus at 4, at the top of the tube 1. The hydrogen is introduced at 5, at the bottom of the tube; it goes out at 6, at the top of the tube and can be reintroduced at 5, in a recycling operation. The substance obtained by the reduction is drawn off at 7. The catalyser and the ion exchanger are arranged on the walls 3, at 8.

The apparatus shown in Fig. 2 comprises a container 9 in which is put the solution 10 of the substance to be reduced, introduced by a pipe 11. A slow mixer 12 is located in the solution 10. Deflectors 13 prevent the throwing up of the solution. The hydrogen is brought by a pipe 14; a pressure-gauge is connected to a valve 15, located on the pipe 14, and thereby maintains the pressure constant. The substance obtained by the reaction is drawn off by a pipe 17; it can be also reconducted, by a pipe 18 and by means of a pump 19, into the container 9 for undergoing the treatment anew.

The reactor of Fig. 3 comprises two containers 20 and 21, similar to the container 9 of Fig. 2, mounted in series. The substance obtained by the reduction in the container 20 is conducted, by a pipe 22, in the container 21 where the reduction is completed.

The following examples give several ways for carrying out the process according to the invention.

*Example 1.*—An aqueous solution of about 35 oz. of glucose and about 106 oz. of water is introduced at the top of the apparatus of Fig. 1; a catalyser made of Raney nickel and an alkaline ion exchanger (for instance the substance known on the market under the name of Amberlite) are disposed on the several stores of the column. Synthetic ion-exchange resins in bead-like or granular particles approximately one-half a millimeter in diameter are sold under the proprietary trademark "Amberlite" by Rohm & Haas Company, Philadelphia, Pennsylvania. The basic or alkaline "Amberlite" ion exchangers are of a polystyrene amine type having quaternary amine or polyamine functionally active ionizable groups. At the same time, hydrogen under normal pressure is introduced at the bottom of the column. As the reduction of the glucose solution proceeds, a pure solution of sorbitol is drawn off at 7, while the small quantity of gluconic acid formed during the contact with the ion exchanger by dismutation remains fixed on the ion exchanger itself.

The operation, being a continuous one, the ion exchanger is regenerated by sweeping away the gluconic acid by means of an alkaline aqueous solution, that converts the gluconic acid to the corresponding salt in a pure state. To permit the carrying out of such a regeneration without suspending the hydrogenation, an installation could comprise several columns like that of the column of Fig. 1.

During the whole operation the temperature is maintained at about 90° C.

*Example 2.*—A solution of about 35 oz. of invert sugar and about 176 oz. of water is put in the reactor as well as hydrogen under a pressure of about 1422 lbs. per sq. inch. The reaction is performed in presence of a mixture of a ion exchanger, for instance the synthetic exchanger known in the market under the name of dowex, and of a catalyser, for instance palladium. Synthetic ion-exchange resins are sold under the proprietary trademark "Dowex" by The Dow Chemical Company, Midland, Michigan. The "Dowdex" ion-exchangers are of a styrene-divinyl benzene matrix to which are attached functionally active ionizable groups. The basic or alkaline "Dowex" ion-exchangers contain quaternary ammonium or polyalkylamine groups as the functionally active ionizable groups. As the hydrogenation proceeds, a solution of pure manitol is drawn off. The temperature is maintained at about 65° C.

*Example 3.*—A solution of about 35 oz. of aldol and of about 71 oz. of methanol, eventually with water, is put into the reactor, then hydrogenated under low pressure (142 to 284 lbs. per sq. inch) and at a temperature of about 40 to 60° C. The reduction is carried out in presence of platinum oxide as a catalyser and of a natural ion exchanger, for instance the exchanger known in the market under the name of Zeolite. Zeolite is a nonproprietary name known to the art to identify naturally occurring minerals which are hydrous silicates of aluminum. In these hydrous silicate minerals there may be contained alkali or alkaline earth metals, such as sodium, potassium, calcium, magnesia, etc. and these atoms balance the negative charges of the mineral framework and may be readily replaced by exchangeable ions. The substance obtained is butandiol 1–3.

The invention is not restricted to the examples hereabove disclosed. Other oxyaldehydes could be used, lactose, maltose, dextrins, etc. The invention may be conveniently applied to oxyketone compounds.

The catalyser could be nickel precipitated as a carbonate and reduced under influence of hydrogen, or as precipitated by a decomposition of the carbonyl of nickel; or it could be cobalt.

One can use any ion exchanger, natural or synthetic. The pressures during the reaction can vary from about 14 to 2133 lbs. per sq. inch and the temperatures from 1 to 150° C.

In the case where the ion exchanger has an acid reaction, it can be useful to work in presence of a second ion exchanger, showing an alkaline reaction, which will be able to fix the acid created.

What we claim is:

1. A catalytic hydrogenation process for obtaining an alcohol, free from the corresponding acid, by reducing a corresponding carbonyl compound selected from the group consisting of corresponding aldehyde and ketone compounds at a temperature from 1° to 150° C. and a pressure from about 14 to 2133 pounds per square inch, the process including: concurrently contacting hydrogen and an aqueous solution, consisting essentially of the corresponding carbonyl compound, with an aggregate consisting essentially of a hydrogenation catalyst and an alkaline material consisting essentially of a nonsoluble anion exchange material.

2. The process of claim 1 in which the hydrogenation catalyst is nickel.

3. The process of claim 1 in which the hydrogenation catalyst is Raney nickel.

4. The process of claim 1 in which the hydrogenation catalyst is a decomposed carbonyl of nickel.

5. The process of claim 1 in which the hydrogenation catalyst is paladium.

6. The process of claim 1 in which the hydrogenation catalyst is platinum oxide.

7. The process of claim 1 in which the hydrogenation catalyst is cobalt.

8. The process of claim 1 in which the pressure during the contacting is held at about 14 to 1422 pounds per square inch.

9. A catalytic hydrogenation process for obtaining a secondary alcohol, free from the corresponding acid, by reducing a corresponding oxyaldehyde compound at a temperature from 1° to 150° C. and a pressure from about 14 to 1422 pounds per square inch, the process including: concurrently contacting hydrogen and an aqueous solution consisting essentially of the corresponding oxyaldehyde compound with an aggregate consisting essentially of a hydrogenation catalyst and an alkline material consisting essentially of a nonsoluble anion exchange material.

10. The process of claim 9 in which the hydrogenation catalyst is nickel and the nonsoluble anion exchange material is a synthetic anion exchange resin.

11. A catalytic hydrogenation process for obtaining an alcohol, free from the corresponding acid, by reducing a corresponding carbonyl compound selected from the group consisting of corresponding aldehyde and ketone compounds at a temperature from 1° to 150° C. and a pressure from 14 to 2133 pounds per square inch, the process including: flowing hydrogen upward through a perforated means supporting an aggregate bed consisting essentially of a hydrogenation catalyst and a nonsoluble anion exchange material; and concurrently therewith, passing as aqueous solution consisting essentially of the corresponding carbonyl compound downward through the aggregate bed and the perforated means.

12. A catalytic hydrogenation process for obtaining sorbitol, free from gluconic acid, by reducing glucose at a temperature from 1° to 150° C. and a pressure from about 14 to 1422 pounds per square inch, the process including: flowing hydrogen upward through a perforated means supporting an aggregate bed consisting essentially of a nickel hydrogenation catalyst and a nonsoluble anion exchange material consisting essentially of a synthetic anion exchange resin; and concurrently therewith, passing an aqueous solution consisting essentially of glucose downward through the aggregate bed and the perforated means.

13. A continuous catalytic hydrogenation process for obtaining an alcohol, free from the corresponding acid, by reducing a corresponding carbonyl compound selected from the group consisting of corresponding aldehyde and ketone compounds, the process comprising: introducing hydrogen into a lower portion of a first column; flowing the hydrogen upward in the first column through a perforated means supporting an aggregate bed consisting essentially of a hydrogenation catalyst and a nonsoluble anion exchange material, said aggregate bed at a temperature from 1° to 150° C. and said hydrogen at a pressure from about 14 to 2133 pounds per square inch; removing hydrogen from an upper portion of the first column; concurrently with the introducing, flowing, and removing of hydrogen, introducing into an upper portion of the first column an aqueous solution consisting essentially of the corresponding carbonyl compound; passing the aqueous solution downward in the first column through the aggregate bed and the perforated means; after passing the aqueous solution downward, removing the aqueous solution, now containing the alcohol free from the corresponding acid, from a lower portion of the first column; subsequently carrying forth the foregoing process steps in a second column and interrupting the foregoing process steps in the first column; during the interrupting of said foregoing process in the first column, passing an aqueous alkaline solution through the aggregate bed and removing the aqueous alkaline solution, now containing the corresponding acid, from the first column; after removing the aqueous alkaline solution from the first column, carrying forth said foregoing process steps in the first column and interrupting said foregoing process steps in the second column; and during the interrupting of said foregoing process steps in the second column, passing an aqueous alkaline solution through the aggregate bed and removing the aqueous alkaline solution, now containing the corresponding acid, from the second column.

References Cited in the file of this patent

UNITED STATES PATENTS

| | | |
|---|---|---|
| 1,990,245 | Mueller | Feb. 5, 1935 |
| 2,572,941 | McLean et al. | Oct. 30, 1951 |
| 2,650,941 | Koome et al. | Sept. 1, 1953 |

FOREIGN PATENTS

| | | |
|---|---|---|
| 306,471 | Great Britain | Feb. 5, 1935 |
| 515,820 | Canada | Aug. 23, 1955 |

OTHER REFERENCES

Baker: "Sorption of Anions By Hydrous Alumina," Dissertation for Doctorate, Columbia Univ., New York City, 1940, pp. 5–21.

Galat: J. A. C. S., vol 70, p. 3945 (1948).

Rohm & Haas Co., The Resinous Reporter, vol. IX, No. 4, pp. 5–11 (July 1948).

Schmidle et al.: Ind. Eng. Chem., vol. 44, p. 1388.